United States Patent [19]

Eygermans

[11] 3,801,463

[45] Apr. 2, 1974

[54] PREPARATION OF ENZYMES IN PARTICULATE FORM

[75] Inventor: Petrus Johannes Eygermans, Wateringen, Netherlands

[73] Assignee: Koninklijke Nederlandsche Gist-En Spiritus-Fabriek N.V., Delft, Netherlands

[22] Filed: Oct. 13, 1971

[21] Appl. No.: 188,961

[30] Foreign Application Priority Data
Oct. 14, 1970  Great Britain .................... 48925/70

[52] U.S. Cl. ............. 195/68, 195/63, 195/DIG. 11, 252/89
[51] Int. Cl. ............................................ C07g 7/02
[58] Field of Search .......... 425/8; 264/8, 5; 195/63, 195/68, DIG. 11; 252/316, 89

[56] References Cited
UNITED STATES PATENTS
3,519,570  7/1970  McCarty ........................... 195/63 X
3,445,563  5/1969  Clegg et al. ...................... 252/316 X
3,499,745  3/1970  Plumat ............................... 264/8 X
3,634,258  1/1972  Wildi et al. ....................... 195/63 X Primary Examiner—David M. Naff
Attorney, Agent, or Firm—Hammond & Littell

[57] ABSTRACT

A process for preparing an enzyme composition in particulate form by centrifugally dispersing a liquid containing an enzyme and a binder from identical teeth which move along a circular path in a horizontal or substantially horizontal plane, said teeth having tops arranged to form droplets which are allowed to travel freely through a cooling zone to form solid particles comprising the enzyme and the binder. The process results in enzyme-containing particles having a narrow range of particle sizes and substantially no dust fraction, which enzyme-containing particles are extremely useful for inclusion in washing compositions.

11 Claims, 6 Drawing Figures

PATENTED APR 2 1974

PREPARATION OF ENZYMES IN PARTICULATE FORM

STATE OF THE ART

The usual methods for preparing enzymes in particulate form which are generally used for preparing enzyme-containing washing compositions suffer from the fact that the products so prepared consist of particles having sizes distributed over a broad range with the disadvantage that such particulate products contain a considerable amount of a fraction having a fineness that gives rise to dusting, which is undesirable when these products are to be used for incorporation in washing compositions.

One conventional method is a prill method using nozzles which give rise to very wide ranges of particle size distributions and a considerable amount of a dusting fraction. In addition to this disadvantage, the use of nozzles has other disadvantages the most important of which are clogging of the nozzles which happens very easily, and abrasion caused by the operating conditions such as the high delivery pressures. In the so-called two fluid system, a compressed gas is used to entrain the composition in particulate form, and in the so-called one fluid system, the composition is pressed through the nozzles under very high pressures, e.g. 80 atmospheres. A further disadvantage is that any particular nozzle gives one specific range of particle sizes and when a different (e.g. coarser) particle size range is desired, a different nozzle must be used.

OBJECTS OF THE INVENTION

It is an object of the invention to provide a novel method of preparing enzymes in particulate form with a relatively narrow particle size range and substantially free from a dusting fraction.

It is a further object of the invention to provide a novel process for the preparation of enzymes in a particulate form which is extremely stable.

It is an additional object of the invention to provide a novel apparatus for obtaining enzymes in particulate form having relatively narrow particle size range and free from a dusting fraction.

These and other objects and advantages of the invention will become obvious from the following detailed description.

THE INVENTION

The novel process of the invention for the preparation of enzymes in particulate form with a relatively narrow size range and free from a dusting fraction comprises centrifugally dispersing a liquid containing an enzyme and a binder from a plurality of identical teeth moving along a circular path in a horizontal or substantially horizontal plane and having tops arranged to form droplets of a required uniform size, allowing the dispersed droplets to travel freely through a cooling zone to form solid particles comprising the enzyme and the binder and recovering the solid particles. Since it is not advisable to subject enzymes to a temperature above about 60° C., as they are generally unstable at higher temperatures, it is preferable for the binder to be liquid above a temperature of less than 60° C. and solid when cooled to some extent below that temperature. The speed of the teeth should be such that the centrifugal force on the liquid allows the particular liquid to form droplets of the desired size upon dispersion from the teeth.

Advantageously, the teeth are formed on the periphery of a horizontal disc having a substantially planar upper surface and a plan view such that the teeth are equiangularly spaced and the peripheral form of the disc between each tooth is outwardly concave. Adjacent teeth may be separated by either a V-notch or an arcuate notch. If desired, the upper surface of the disc may include outwardly extending channels for guiding the liquid towards the teeth.

Conveniently the liquid is allowed to fall onto the disc near its center and a particularly suitable form of liquid supply means comprises a heated trough disposed above the disc and having a central cylindrical weir surrounding an aperture through which the liquid can pass, said trough also having means for re-supplying it with liquid composition. More suitably the weir may comprise a wall extending downwardly below the bottom of the trough so that the liquid may fall freely from the lower edge of the wall onto the disc as a cylindrical curtain. In such an arrangement the disc drive shaft may be disposed vertically within said aperture coaxial with the weir.

Suitably the cooling zone comprises fluid at a temperature well below, e.g. 20° C. or more below, the weakening temperature of the binder employed. Advantageously, the drying medium is a gas preferably air. Desirably, the coding zone may be defined by a tank having dimensions such that the particles are solidified before they reach the walls or the bottom of the tank. Suitable tank dimensions are diameters of, e.g. 10 to 20 m, and heights of, e.g. 10 to 30 m. The solidified particles are collected at the bottom of the tank, and may be passed to a separating means in order to separate excessively large particles originating from agglomerations caused by cold parts of the device when starting the process. An example of a suitable separating means is a vibrating sieve.

The apparatus of the invention for forming an enzyme composition in particulate form comprises a rotatable horizontal disc having a substantially planar upper surface and a regularly toothed periphery, and means for applying a cylindrical curtain of a liquid composition to the upper surface of the disc concentrically therewith for centrifugal dispersion from the teeth on the disc periphery. Suitable forms of teeth include symmetrical triangular teeth, saw teeth which are rotated in a direction opposite to the direction of inclination of the teeth, or radially bars having outer rounded ends.

Liquid compositions useful in the invention are preferably liquids solidifying at temperatures between about 40° to 60° C., preferably between about 50° to 55° C. Temperatures above 60° C. are not convenient because, as mentioned above, enzymes generally are unstable at these temperatures. The liquid is kept in the molten state until it reaches the rotating disc and then the droplets are conducted through a cooling fluid, preferably air, at a temperature below the solidifying point of the liquid composition, for example below about 30° C., preferably below about 20° C.

Suitable binders for use in the liquid enzyme compositions are those having the above mentioned weakening points, i.e. solidify below 60° C. and preferably at 40°–60° C., are compatible with the enzyme and the eventual composition, e.g. the washing composition, and furthermore are suitable to form a granular product with the enzyme. Examples of useful binders are non-ionic detergents having an appropriate weakening point such as fatty alcohol-ethylene oxide adducts. An extremely useful fatty alcohol-ethylene oxide adduct is the $C_{18}$-fatty alcohol-ethylene oxide adduct containing about 80 moles of ethylene oxide units which has a weakening point of 54° C.

Mixing of enzymes with ethylene adducts having melting points in the above mentioned ranges for granulating purposes is known per se, but the known method refers to a granulating process in which molten ethylene adduct is brought onto a granulating tray containing enzyme in powder form, which process also has the disadvantage that a considerable amount of a fine fraction is present in the final product.

Although the process of the invention has been primarily developed for proteolytic enzymes suitable for use in washing compositions, it is also possible to use the invention with other enzymes such as amylases, and for mixtures of enzymes. Furthermore, complexes of enzymes with, for example, polymers are suitable, such as complexes of an enzyme with a maleic acid-styrene copolymer.

The enzymes in particulate form obtained by the invention may be used, for example, for formulating washing compositions. In these cases, the enzyme is preferably a proteolytic enzyme such as MAXTASE produced by a *Bacillus* species. Such washing compositions additionally contain one or more detergents which are normally used in enzyme-containing washing compositions such as non-ionic or anionic surface-active compounds, e.g. sodium benzenesulfonate. The washing compositions may also contain additional substances which are commonly used in washing compositions such as complex phosphates, for example sodium tripolyphosphate or sodium pyrophosphate, phosphate-free water-softeners such as cyanotriacetic acid or salts thereof or sodium citrate. Other compounds which may be incorporated are, for example, anhydrous sodium silicate, weakly alkaline compounds such as sodium bicarbonate, a perborate such as sodium perborate, fillers such as sodium or calcium sulfate, other compounds such as carboxymethyl-cellulose, perfumes, optical brighteners, and substances for whitening the enzyme product itself such as titanium dioxide.

Another aspect of the invention provides an enzyme composition in particulate form prepared by any of the above methods or apparatus.

By the process of the invention and the apparatus used therein, it is possible to obtain enzyme compositions with particle sizes distributed over a relatively narrow range (e.g. $200\mu - 700\mu$) which are substantially free from dusting fractions of particle size below, for example, $50\mu$. The enzyme compositions so obtained in particulate form have a relatively high stability, and this is highly desirable when used in washing compositions, especially those containing an oxidizing agent such as a perborate.

Referring now to the drawings

Figure 1:
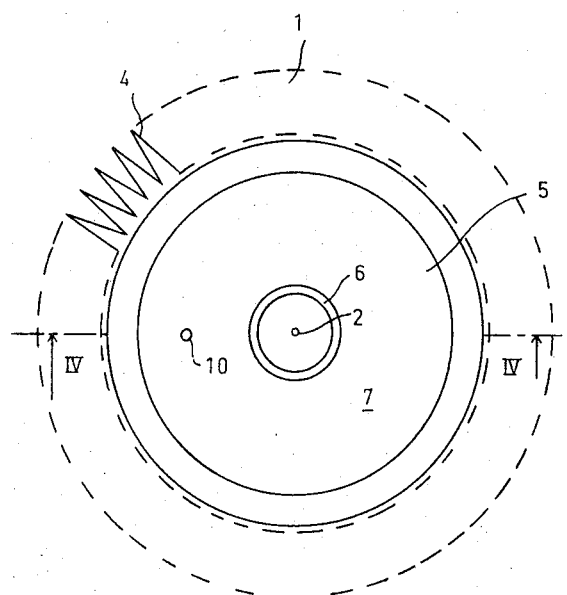
FIG. 1 is a plan view of a rotatable disc and supply device according to one embodiment of the invention.
Figure 4:
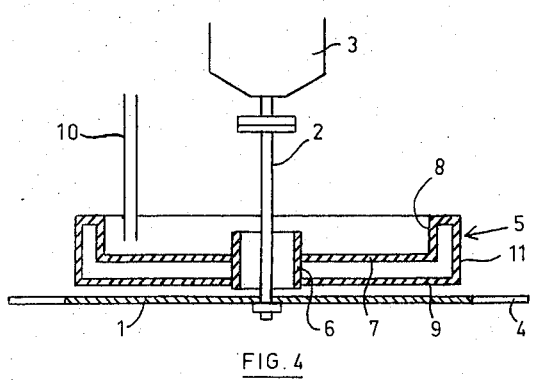
FIG. 4 is a cross-sectional view partially along the line IV—IV in FIG. 1, of the device illustrated in that Figure.

FIGS. 1 and 4 show an embodiment comprising a rotatable disc 1 mounted on a drive shaft 2 driven by a motor 3. The disc 1 is provided with teeth 4, equiangularly distributed around the circumference. In this embodiment, the teeth 4 are symmetrical triangular teeth. The enzyme-containing liquid is supplied to the rotatable disc from a supply trough 5 having a cylindrical weir 6 near the center of disc 1 and concentric therewith. The weir 6 is connected to upper floor 7 and lower floor 9 of the trough which also has radially inner and outer upstanding side walls 8 and 11, respectively. Liquid is supplied to the trough by a tube 10 from a suitable reservoir (not shown). When the trough contains sufficient liquid, the liquid runs over the edge of the weir 6 on to disc 1. The tube 10 may be connected to a heating device for heating the enzyme-containing composition up to a predetermined temperature before entering the trough.

In order to keep the enzyme-containing liquid at a suitable temperature, the space between the double walls of the trough 5 is occupied by a heating fluid such as hot water which may be circulated therethrough.

By rotation of disc 1, the liquid thereon is forced to run to the circumference of the wheel and reaches the teeth, and substantially at the end of the teeth the liquid leaves the teeth in the form of fine drops.

Figure 2:
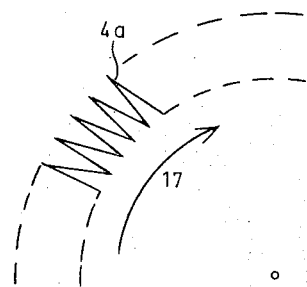
FIGS. 2 and 3 show partial plan views of other embodiments of suitable rotatable discs.

FIG. 2 shows another embodiment of a suitable disc having saw teeth 4a instead of the symmetrical teeth 4 of FIG. 1. In this case, the disc is rotated in a direction opposite to the direction of inclination of the teeth, as indicated by the arrow 17. This embodiment is considered advantageous since the drops tend to leave the teeth at the trailing edge thereof.

Figure 3:
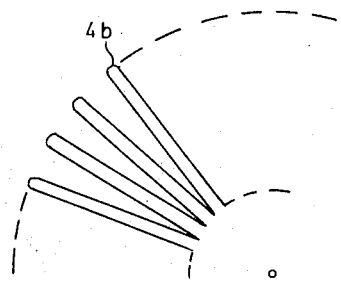

FIG. 3 shows a further embodiment of disc in which the teeth are in the form of radially outwardly extending bars 4b having rounded outer ends.

Figure 5:
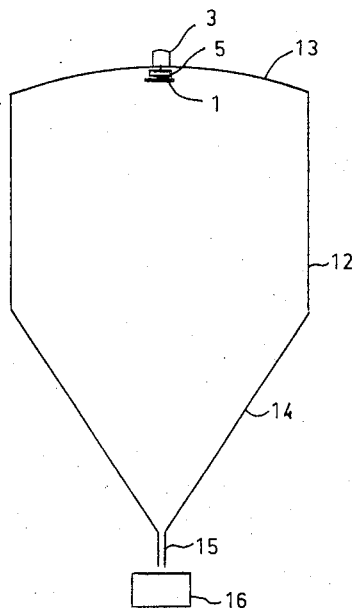
FIG. 5 shows a longitudinal sectional view of a tank in which the device according to the invention is incorporated.
Figure 6:
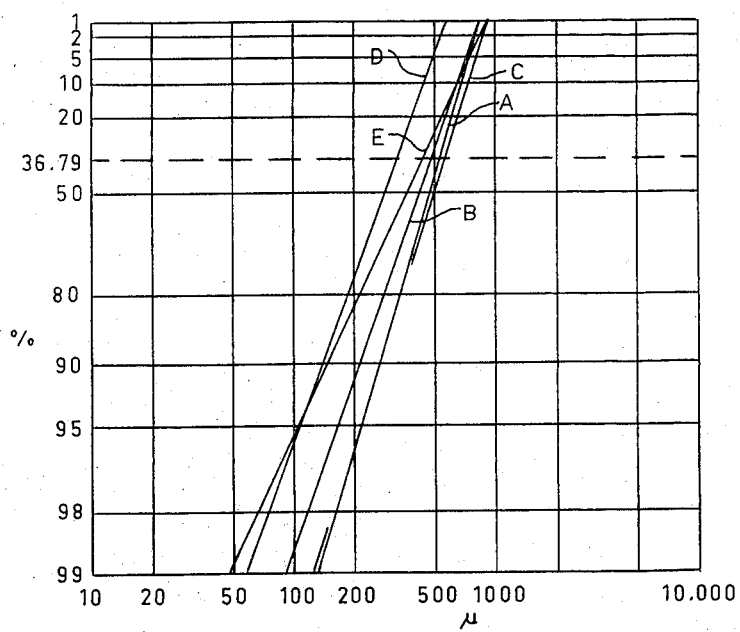
FIG. 6 is a graph showing the particle size distribution of the product obtained in the Example.

FIG. 5 shows a drying or cooling tank provided with the device of FIGS. 1 and 4, and within which tank the cooling zone is disposed. This embodiment of tank 12 is provided with a dome-shaped cover 13, to which the droplet generating device is attached. The cooling tank 12 is further provided with a conical bottom 14, ending in an outlet pipe 15, where the particulate product may be collected. A separator 16 shown in FIG. 5 may be present for separating the coarse material having sizes of over, e.g. 1 mm. Suitably, the separating device 16 is a vibrating sieve or air separator.

The teeth 4 and **4*a* have a length of preferably 5 to 20%, more preferably 7.5 to 15%, of the diameter of disc 1**. For a disc of a diameter of, e.g., 40 cm., the tooth lengths are preferably 2 to 8 cm., more preferably 3 to 6 cm. In practice, those tooth lengths give good results.

Suitable speeds at which disc 1 should be driven in order to produce droplets having particle sizes preferably greater than 50 to 100 $\mu$ are those speeds subjecting the droplets to resultant accelerations of 10,000 to 25,000 m/sec$^2$, preferably 15,000 to 22,000 m/sec$^2$. For a disc having a diameter of 40 cm., those accelerations correspond with speeds of 2,100 to 3,400 rpm, preferably 2,600 to 3,200 rpm. Higher accelerations cause the droplets leaving the disc to be of smaller size.

In the following example there is described a preferred embodiment to illustrate the invention. However, it should be understood that the invention is not intended to be limited to the specific embodiments.

EXAMPLE

A liquid composition containing the following substances was used for the process of the invention:

| | |
|---|---|
| MAXTASE (a protease produced by a Bacillus strain) | 25% |
| $C_{18}$-fatty alcohol-ethylene oxide adduct containing about 80 moles of ethylene oxide units | 55% |
| Titanium dioxide | 5% |
| Fillers | 15% |

This composition was distributed at several different velocities onto a rotating disc of 40 cm diameter provided with 72 teeth of symmetrical shape having a depth of 4.5 cm. The disc was rotating at a speed of 2,900 rpm corresponding with a circumferential acceleration of 18,500 m/sec$^2$ in an axial direction. The enzyme-containing liquid was introduced at the velocities and temperatures indicated in the Table below which also indicates the temperatures of cooling air, and sieve residues of the fraction sieved over a 920 $\mu$ sieve. Sieving over the 920 $\mu$ sieve was necessary in order to remove some agglomerates. The agglomerates, which amounted to not more than about 5% of the product, were recycled in the process. The results are as follows:

TABLE

| Sample | supply velocity (liters/hr) | supply temperature (°C) | temperature of cooling air (°C) | sieve residues (% total) sieve 840 $\mu$ | sieve 500 $\mu$ | sieve 315 $\mu$ | sieve 160 $\mu$ | average particle size ($\mu$) |
|---|---|---|---|---|---|---|---|---|
| A | 400 | 59.2 | 16.2 | 0.4 | 47.6 | 79.0 | 97.9 | 540 |
| B | 400 | 55.6 | 17.0 | 1.4 | 34.4 | 65.7 | 95.7 | 480 |
| C | 700 | 58.0 | 17.5 | 4.0 | 49.4 | 81.4 | 98.6 | 560 |

The Table shows that only a very small fraction of particles having sizes below 160 $\mu$ is obtained, i.e. 1.4 to 4.3%. Since dusting of particles appears at particle sizes of about 50 $\mu$ and lower, it can be seen that the enzyme samples are substantially free from a dusting fraction. The Table also shows that the size distribution is relatively narrow, which may also be seen from FIG. 6 which is a sieve graph in which along the horizontal axis are plotted the sieve openings in a logarithmical scale, and along the vertical axis the sieve residues in a probability distribution scale based on the Rosin-Rammler equation.

By way of illustration, FIG. 6 also gives curves D and E of particulate products obtained by a usual prilling method. It is clearly shown that the percentage of fine material is greater than that of the products obtained by the invention (curves A, B and C), while moreover, the slope of the curves of the products of the invention is greater than that of the products obtained by the known process. In other words, the particle size distribution of the products of the invention is smaller which means that the particles have less different sizes.

Various modifications of the process and apparatus of the invention may be made without departing from the spirit or scope thereof and it is to be understood that the invention is intended to be limited only as defined in the appended claims.

I claim:

1. A process for preparing an enzyme composition in particulate form with a relatively narrow size range and free from a dusting fraction consisting essentially of centrifugally dispersing a liquid at a temperature not above 60° C containing an enzyme and a binder which will solidify below 60° C from identical, regularly spaced teeth moving along a circular path in a horizontal or substantially horizontal plane and said teeth having tops arranged to form droplets of a required uniform size, allowing the dispersed droplets to travel freely through a cooling zone to form solid particles comprising the enzyme and the binder and recovering the solid dust-free particles of a relatively narrow size range.

2. A process of claim 1 wherein the binder used will solidify between 40° and 60° C.

3. A process of claim 2 wherein the binder will solidify between 50° and 55° C.

4. A process of claim 1 wherein the binder used is a fatty alcohol-ethylene oxide adduct.

5. A process of claim 4 wherein the fatty alcohol-ethylene oxide adduct is the $C_{18}$-fatty alcohol-ethylene oxide adduct containing about 80 moles of ethylene oxide units.

6. A process of claim 1 wherein the enzyme is a protease produced by a *Bacillus* strain.

7. A process of claim 1 wherein the enzyme is bound as a complex with a polymer.

8. A process of claim 7 wherein the polymer is a maleic acid-styrene polymer.

9. A process of claim 1 wherein the teeth are formed on the periphery of a horizontal disc having a substantially planar upper surface and a plan view such that the teeth are equiangularly spaced and the peripheral form of the disc between each tooth is outwardly concave.

10. A process of claim 9 wherein the adjacent teeth are separated by a V-notch or an arcuate notch.

11. A process of claim 1 wherein the cooling zone comprises a fluid at a temperature well below the weakening temperature of the binder employed.

* * * * *